United States Patent

Akaguma et al.

[11] Patent Number: 5,240,398
[45] Date of Patent: Aug. 31, 1993

[54] SCREW HEAD STRUCTURE

[75] Inventors: Nobuyuki Akaguma; Hiroyoshi Suumen; Atsushi Emoto, all of Chiba, Japan

[73] Assignee: Sumitomo Heavy Industries, Ltd., Tokyo, Japan

[21] Appl. No.: 937,330

[22] Filed: Aug. 31, 1992

[30] Foreign Application Priority Data

Sep. 3, 1991 [JP] Japan ............... 3-223022

[51] Int. Cl.$^5$ ............................................. B29C 45/52
[52] U.S. Cl. ........................................ 425/146; 425/563
[58] Field of Search .................. 366/79, 80, 82, 89; 264/328.1, 328.12; 425/146, 207, 208, 209, 562, 563, 382.3, 382.4

[56] References Cited

U.S. PATENT DOCUMENTS

| | | | |
|---|---|---|---|
| 3,482,285 | 12/1969 | Falkenberg | 425/146 |
| 3,501,810 | 3/1970 | Powell | 425/563 |
| 4,477,242 | 10/1984 | Eichlseder et al. | 425/563 |
| 5,013,233 | 5/1991 | Semmekrot | 425/563 |
| 5,153,149 | 10/1992 | Naito et al. | 425/563 |
| 5,167,971 | 12/1992 | Gill et al. | 425/563 |

FOREIGN PATENT DOCUMENTS

| | | |
|---|---|---|
| 1921058 | 11/1970 | Fed. Rep. of Germany . |
| 2946683 | 5/1981 | Fed. Rep. of Germany . |
| 2515102 | 4/1983 | France . |
| 2598651 | 11/1987 | France . |
| 52-14659 | 2/1977 | Japan ............ 425/563 |

OTHER PUBLICATIONS

"What Injection Molders Should Know About Reciprocating Screw-Tip Shutoffs", Plastics Technology, vol. 13, No. 8, Aug., 1967.

*Primary Examiner*—Scott Bushey
*Attorney, Agent, or Firm*—Nikaido, Marmelstein, Murray & Oram

[57] ABSTRACT

A screw head is composed of a cone portion, a tapered portion formed behind the cone portion and a narrow portion formed behind the tapered portion. A counter-flow stopper ring is provided around the narrow portion so that an annular resin passage is formed between the counter-flow stopper ring and the narrow portion. The tapered portion of the screw head has a plurality of circumferentially spaced grooves. The sectional area of each groove decreases from the inner circumference toward the outer circumference of the tapered portion. The grooves are so formed that the resin flowing through the grooves creates a force which pushes the counter-flow stopper ring backward, the ring being moved forward by forward flow of resin caused during backward movement of the screw. Thus, the grooves help maintain a gap between the counter-flow stopper ring and the screw head.

4 Claims, 4 Drawing Sheets

SCREW HEAD STRUCTURE

BACKGROUND OF THE INVENTION

1. Field of the Invention

The present invention relates to a screw head structure.

2. Description of the Related Art

In a conventional injection molding device, resin heated and fluidized in the heating cylinder is injected under high pressure into the mold, the resin in the mold is cooled to be solidified or cured, then the mold is opened in order to take out the molded article. Such a conventional injection molding device has a screw provided in the heating cylinder so as to be rotatable and movable forward and backward. The screw is moved forward to inject melted resin.

The screw has on its front end a screw head for pushing out resin. The screw head is connected to the screw by internal screw engagement.

FIG. 2 is a sectional view of a conventional screw head structure of an injection molding device. FIG. 2 shows: a screw head 1; a counter-flow stopper ring 2 for stopping resin from flowing back; a seal ring 3 for abutting on the counter-flow stopper ring 2 when the counter-flow stopper ring 2 is moved back; a screw 4; and a heating cylinder 5.

After the cavity of the mold is filled with resin by moving the screw 4 forward, a metering step is then performed in which resin for the next injection is melted and plasticized and is stored in space 6 around the tip of the screw head 1. In the metering step, resin supplied down from a hopper through a material inlet is conveyed forward by rotation of the screw 4 through a groove 4a formed on the screw 4. The resin is melted in the heating cylinder 5 while being conveyed therein, and then stored in the space 6 around the tip of the screw head 1. Melting of the resin generates pressure inside the heating cylinder. The pressure acts on the screw 4 as a reaction force such that the screw 4 is moved backward.

The resin thus stored in the space 6 around the tip of the screw head 1 is injected into the mold through an injection nozzle (not shown) by the screw 4 driven forward by the driving means.

Due to the pressure caused when the resin is injected into the mold, a portion of the resin would flow back through the groove 4a of the screw 4 if this were not prevented by the counter-flow stopper ring 2. The counter-flow stopper ring 2 is provided on a front end portion of the screw 4. To prevent the counter-flow stopper ring 2 from coming apart from the screw 4, the screw head 1 has an outside diameter greater than the inside diameter of the stopper ring 2. The screw 4 and the screw head 1 are coupled by engagement between a female screw 4b formed in the screw 4 and a male screw 1a formed on a rear end portion of the screw head 1.

The counter-flow stopper ring 2 is freely rotatable with respect to the screw head 1 (an individually rotatable counter-flow stopper ring).

In the screw head structure constructed as above, during the metering step, the counter-screw stopper ring 2 is moved forward to abut on the screw head 1 due to pressure caused by the resin conveyed forward as the screw 4 is rotated and moved back. The resin between the inner periphery of the counter-flow stopper ring 2 and the outer periphery of the screw head 1 is conveyed through abutting portions of the counter-flow stopper ring 2 and the screw head 1. Because the screw head 1 is rotated while the counter-flow stopper ring 2 is not rotated, the resin is overheated by friction heat caused by the relative rotation therebetween, resulting in burned resin. Further, friction between the abutting portions of the screw head 1 and the abutting portions of the counter-flow stopper ring 2 causes the abutting portions to abrade.

To eliminate such problems, another screw head structure has been developed in which a counter-flow screw is rotatable together with a screw head (a co-rotatable counter-flow stopper ring).

FIG. 3 is a sectional view of such a conventional screw head structure of an injection molding device. The figure shows: a screw head 1, a seal ring 3, a screw 4, a heating cylinder 5, space around the tip of the screw head 1, and a counter-flow stopper ring 10. Two stopper grooves 11 for restricting rotation of the counter-flow stopper ring 10 are formed on the periphery of the screw head 1. The two stopper grooves 11 are circumferentially arranged. Thus, when the screw head 1 is rotated together with the screw 4, the stopper grooves 11 abut against the counter-flow stopper ring 10 so that the screw head 1 and the counter-flow stopper ring 10 rotate together.

In the conventional screw head structure constructed as above, resin burning will not occur because the counter-flow stopper ring 10 rotates together with the screw head 1. However, twisting torque occurs between the screw head 1 and the stopper ring 10 because while the screw 4 is rotated by the driving means, the screw head 1 receives a reaction force from the counter-flow stopper 10 which hinders the screw head 1 from rotating. Therefore, a portion which fixes the screw head 1 to the screw 4 may sometimes break.

SUMMARY OF THE INVENTION

It is an object of the present invention to provide a screw head structure which eliminates the above problems of the conventional screw head structure, i.e., which prevents resin burning and abrasion from occurring between the counter-flow stopper ring and the screw head and prevents a portion which fixes the screw head to the screw from breaking.

To achieve the above objects, in accordance with the present invention there is provided a screw head structure comprising; a heating cylinder; a screw provided in the heating cylinder so as to be rotatable and movable forward and backward; a screw head connected to a front end portion of the screw and formed of a cone portion, a tapered portion formed behind the cone portion, and a narrow portion formed behind the tapered portion; and a counter-flow stopper ring provided around the outer periphery of the narrow portion of the screw head, whereby a resin conveying passage is formed between the counter-flow stopper ring and the narrow portion. Further, the tapered portion of the screw head has a plurality of grooves which are circumferentially arranged. Sectional area of each groove becomes smaller from the inner circumference toward the outer circumference of the tapered portion.

According to the present invention, the screw is provided inside the heating cylinder so as to be rotatable and movable forward and backward, and the screw head is connected to a front end portion of the screw. Resin melted inside the heating cylinder is conveyed forward to a space around the tip of the screw head by rotating and moving back the screw, and thus the resin is metered. The resin stored in the space around the tip of the screw head is injected through an injection nozzle into the mold by moving the screw forward.

The screw head comprises the cone portion, the tapered portion formed behind the cone portion and the narrow portion formed behind the tapered portion. The counter-flow stopper ring is provided around the narrow portion so that an annular resin passage is formed between the counter-flow stopper ring and the narrow portion. The counter-flow stopper ring is moved forward by forward flow of resin which is caused when the screw is moved backward, and it is moved backward when the screw is moved forward so as to prevent resin from flowing back.

The tapered portion of the screw head has a plurality of grooves which are circumferentially arranged and whose sectional areas become smaller from the inner circumference toward the outer circumference of the tapered portion. When the counter-flow stopper ring is moved forward by forward flow of resin which is caused when the screw is moved backward, flow of resin through the grooves creates a force which pushes the counter-flow stopper ring backward. Thus, a gap between the screw head and the counter-flow stopper ring can be maintained.

Further objects, features and advantages of the present invention will become apparent from the following description of the preferred embodiments with reference to the attached drawings.

DESCRIPTION OF THE PREFERRED EMBODIMENTS

An embodiment of the present invention will be described hereinafter with reference to FIGS. 1, 4A, 4B and 5.

Figure 1:
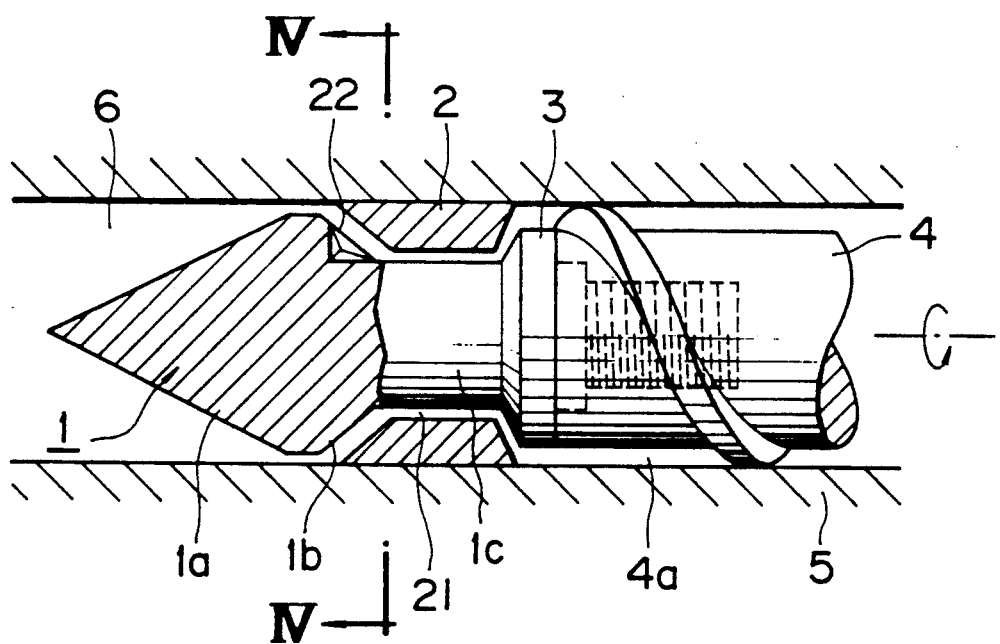
FIG. 1 is a sectional view of a screw head structure of an injection molding device according to an embodiment of the present invention.
Figure 2:
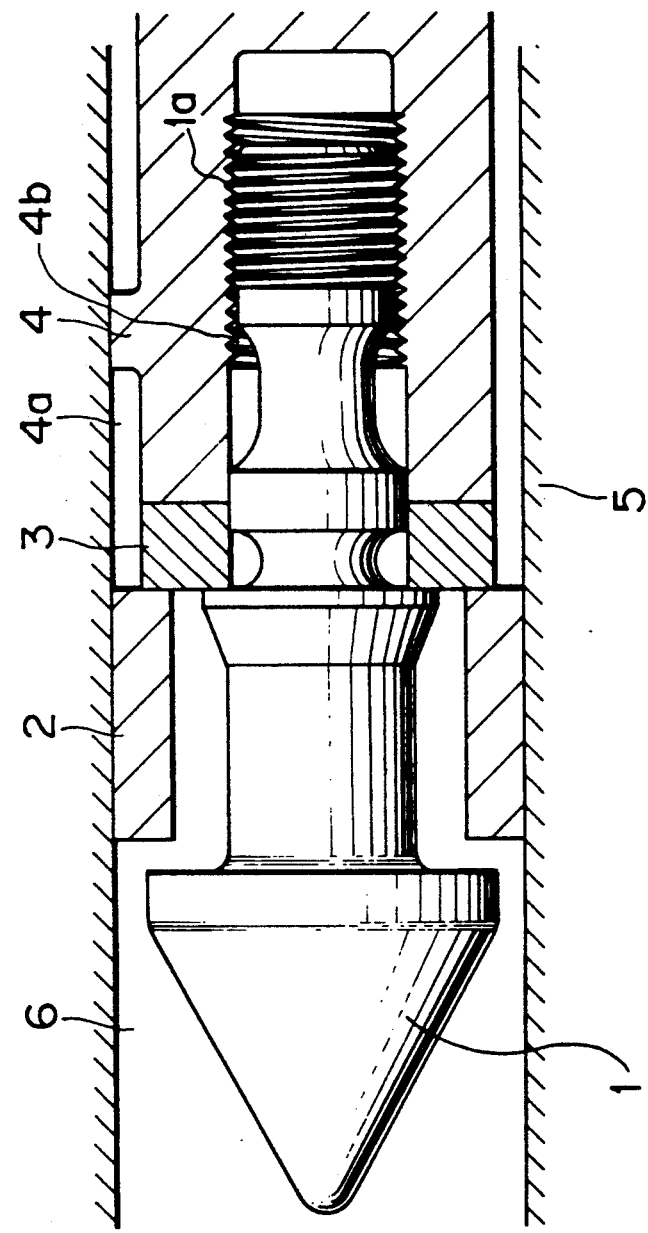
FIG. 2 is a sectional view of a conventional screw head structure of an injection molding device.
Figure 3:
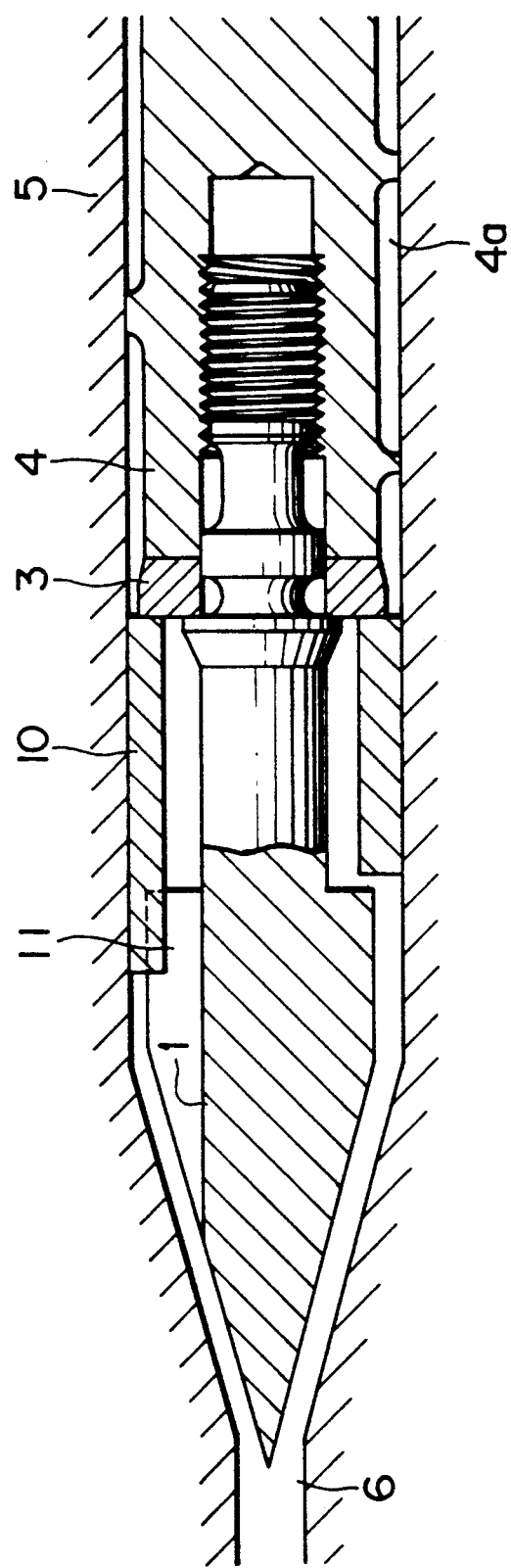
FIG. 3 is a sectional view of another conventional screw head structure of an injection molding device.

Referring to FIG. 1, a screw head 1 comprises a cone portion 1a, a tapered portion 1b formed behind the cone portion 1a, and a narrow portion 1c formed behind of the tapered portion 1b. A counter-flow stopper ring 2 is provided around the narrow portion 1c. An annular resin passage 21 is formed between the internal periphery of the counter-flow stopper ring 2 and the outer periphery of the narrow portion 1c. Resin is conveyed forward through the resin passage 21. A seal ring 3 is provided behind the counter-flow stopper ring 2. When the counter-flow stopper ring 2 is moved back to abut on the seal ring 3, the two rings 2 and 3 form a sealing to stop the resin from flowing back. FIG. 1 further shows a screw 4 and a heating cylinder 5 surrounding the screw 4.

When the cavity of the mold is filled with resin by moving the screw 4 forward, a metering step follows in which resin for the next injection is melted and plasticized and is stored in space 6 around the tip of the screw head 1. In the metering step, while the screw 4 is being moved backward by a driving means (not shown), resin supplied down from a hopper through a material inlet is conveyed by rotation of the screw 4 forward through a groove 4a formed on the screw 4. The resin is melted in the heating cylinder 5 while being conveyed therein, and then stored in the space 6 around the tip of the screw head 1. Melting of the resin generates pressure inside the heating cylinder. The pressure acts on the screw 4 as a reaction force such that the screw 4 is moved backward.

The resin thus stored in the space 6 around the tip of the screw head 1 is injected into the mold through an injection nozzle (not shown) by the screw 4 driven forward by the driving means.

Due to the pressure caused when the resin is injected into the mold, a portion of the resin would flow back through the groove 4a of the screw 4 if this were not prevented by the counter-flow stopper ring 2. The counter-flow stopper ring 2 is provided on a front end portion of the screw 4. To prevent the counter-flow stopper ring 2 from coming off from the screw 4, the screw head 1 has an outside diameter greater than the inside diameter of the screw 4. The screw 4 and the screw head 1 are coupled by engagement between a female screw formed in the screw 4 and a male screw formed on a rear end portion of the screw head 1.

Figure 4A:
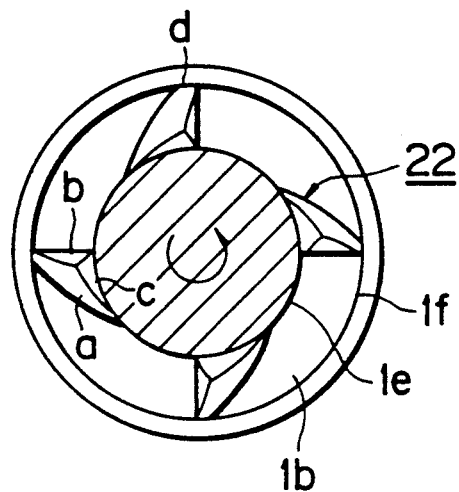
FIG. 4A is a front view of the tapered portion of the screw head structure taken along the line IV—IV of FIG. 1.
Figure 4B:
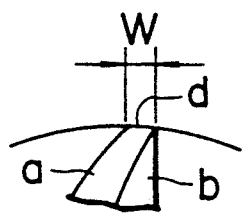
FIG. 4B is an enlarged view of one of the grooves shown in FIG. 4A.

As shown in FIG. 4A, the tapered portion 1b is formed to circumferentially extend all around the screw head 1 and have an inner circumference 1e and an outer circumference 1f. The tapered portion 1b has a plurality, e.g., four, of wing-shaped grooves 22 which are circumferentially arranged. Each of the wing-shaped grooves 22 has the shape of a triangular pyramid having three substantially triangular sloped surfaces a to c whose bottom sides lie on the surface of the tapered portion 1b.

The bottom side of the sloped surface a of each groove 22 has one end on the inner circumference 1e and the other end on the outer circumference 1f, and extends from the inner circumference 1e to the outer circumference 1f diagonally clockwise on the premise that the screw 4 rotates counterclockwise. The bottom side of the sloped surface b of each wing-shaped groove 22 has one end on the inner circumference 1e and the other end on the outer circumference 1f, and extends perpendicularly to the rotational direction. The bottom side of the sloped surface c of each wing-shaped groove 22 extends along the inner circumference 1e. Thus, sectional area of each wing-shaped groove 22 becomes smaller from the inner circumference 1e toward the outer circumference 1f.

The sloped surface a of each wing-shaped groove 22 has at the outer circumference 1f a summit portion d which has a width of W and helps the resin flow smoothly. The summit portions d initiate flow of the resin when the screw 4 starts to rotate.

In the screw head structure constructed as above, when the screw 4 is moved back while being rotated, the resin around the screw 4 is conveyed forward and the counter-flow stopper ring 2 is moved forward by pressure caused by the resin being conveyed. When the counter-flow stopper ring 2 reaches a predetermined position, the resin flowing through the wing-shaped grooves 22 formed in the tapered portion 1b creates a force which pushes back the counter-flow stopper ring 2. Thus, a gap between tapered portion 1b and the end surface of the counter-flow stopper ring 2 is maintained.

Figure 5:
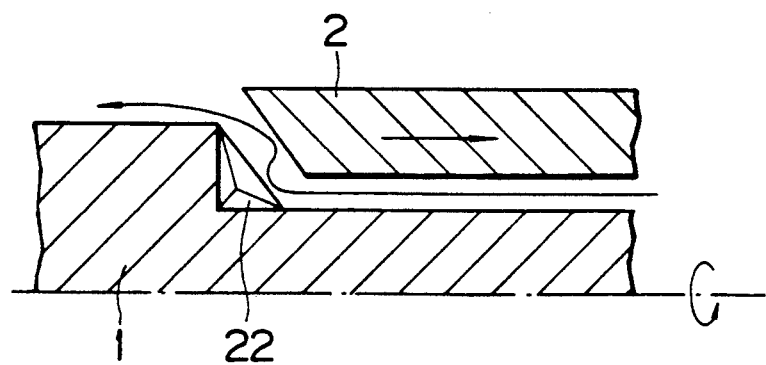
FIG. 5 illustrates how resin flows in the screw head structure of the present invention.

In more detail, due to counterclockwise rotation of the screw 4, the resin flows through the wing-shaped grooves 22 formed in the tapered portion 1b. As shown in FIG. 5, the resin which flows through each groove 22 first flows between the sloped surfaces a and c and then between the sloped surfaces a and b. The force which moves back the counter-flow stopper ring 2 is thus created.

As described above, because the screw head 1 and the counter-flow stopper ring 2 do not contact each other during rotation of the screw 4, resin burning and abrasion are prevented. Even if local sheering stress is created in resin in a gap between the screw head 1 and the counter-flow stopper ring 2, resin burning will not occur in the gap therebetween because the wing-shaped grooves 22 efficiently scoop the resin in the gap and convey it through the gap.

Further, abrasion between the outer peripheral surface of the counter-flow stopper ring and the inner peripheral surface of the heating cylinder can be reduced because resin does not stay in the gap but is efficiently conveyed through the gap, whereby both replacing the currently used resin with another resin, e.g., of different color, and kneading resin can be efficiently carried out.

Further, because the counter-flow stopper ring 2 is not rotated while the screw head is being rotated, a portion fixing the, screw head 1 to the screw 4 will not break.

It is to be understood that the invention is not limited to the above-described embodiment. To the contrary, the invention is intended to cover various modifications and equivalent arrangements included within the spirit and scope of the appended claims.

For example, though the wing-shaped grooves 22 are formed substantially in the shapes of triangular pyramids, they may be formed in other shapes as long as sectional area of each wing-shaped groove 22 becomes smaller from the inner circumference 1e toward the outer circumference 1f.

What is claimed is:

1. A screw head structure comprising:
a heating cylinder:
a screw provided inside said heating cylinder so as to be rotatable and movable forward and backward;
a screw head connected to a front end portion of said screw and comprising a cone portion, a tapered portion formed behind said cone portion and having an inner periphery and an outer periphery, and a narrow portion extending backward from said inner periphery of said tapered portion;
and a counter-flow stopper ring provided around an outer periphery of said narrow portion of said screw head so that an annular resin passage is formed between said counter-flow stopper ring and said narrow portion,
wherein said tapered portion of said screw head has a plurality of grooves which are circumferentially arranged and whose sectional areas become smaller from said inner periphery toward said outer periphery of said tapered portion.

2. A screw head structure according to claim 1, wherein each of said grooves is formed of three substantially triangular sloped-surfaces whose bottom sides lie on the surface of said tapered portion.

3. A screw head structure according to claim 2, wherein the bottom side of the first sloped surface of said three substantially triangular sloped surfaces of each groove has one end on said inner periphery and the other end on said outer periphery of said tapered portion and extends from said inner periphery to said outer periphery diagonally in the reverse direction of the rotation of said screw, and the bottom side of the second sloped surface of said three substantially triangular sloped-surfaces of each groove has one end on said inner periphery and the other end on said outer periphery of the tapered portion and extends substantially perpendicularly to the direction of rotation of said screw, and the bottom side of the third sloped surface of said three substantially triangular sloped-surfaces of each groove extends along said inner periphery.

4. A screw head structure according to claim 3, wherein said first sloped surface of each groove has a short side which extends along said outer periphery of said tapered portion.

* * * * *